(12) United States Patent
Bonacci

(10) Patent No.: US 7,681,903 B1
(45) Date of Patent: Mar. 23, 2010

(54) TRAILER BACKUP ALIGNMENT GUIDE

(76) Inventor: Larry J. Bonacci, 11307 Warmington St., Riverside, CA (US) 92503

( * ) Notice: Subject to any disclaimer, the term of this patent is extended or adjusted under 35 U.S.C. 154(b) by 154 days.

(21) Appl. No.: 12/009,288

(22) Filed: Jan. 18, 2008

Related U.S. Application Data

(60) Provisional application No. 60/898,185, filed on Jan. 30, 2007.

(51) Int. Cl.
  *B60D 1/36* (2006.01)
(52) U.S. Cl. ............................ 280/477; 280/511
(58) Field of Classification Search ........... 280/477, 280/511
  See application file for complete search history.

(56) References Cited

U.S. PATENT DOCUMENTS

| | | | | |
|---|---|---|---|---|
| 2,815,732 | A | * | 12/1957 | Majors ............... 116/28 R |
| 4,723,788 | A | * | 2/1988 | Suter ................. 280/477 |
| 5,035,441 | A | * | 7/1991 | Murray ............... 280/477 |
| 5,269,554 | A |   | 12/1993 | Law et al. |
| 5,558,352 | A | * | 9/1996 | Mills ................. 280/477 |
| 5,669,621 | A | * | 9/1997 | Lockwood ........... 280/477 |
| 5,680,706 | A | * | 10/1997 | Talcott ............... 33/286 |
| 6,139,041 | A |   | 10/2000 | Murphy |
| 6,764,091 | B1 |   | 7/2004 | Grasso et al. |
| 6,820,888 | B1 |   | 11/2004 | Griffin |
| 2002/0070529 | A1 |   | 6/2002 | Dravecz |
| 2005/0194761 | A1 | * | 9/2005 | Givens ............... 280/477 |
| 2007/0175053 | A1 | * | 8/2007 | Seely et al. .......... 33/264 |
| 2009/0127824 | A1 | * | 5/2009 | Young ................ 280/477 |

* cited by examiner

*Primary Examiner*—Lesley Morris
*Assistant Examiner*—Marlon A Arce
(74) *Attorney, Agent, or Firm*—Gordon K. Anderson

(57) ABSTRACT

A trailer backup alignment guide apparatus (10) is taught for aligning a vehicle hitch ball (20) to a trailer coupler (22) for attachment therebetween. The apparatus consists of a vehicle ball mount (28) incorporating a ball mounting strap (36) encompassing a vehicle ball. A vehicle mast (58) is disposed within the hitch ball mount in a vertical position. A trailer hitch coupler mount (62) is attached to the trailer which includes an L-shaped base block (64) with a telescoping trailer mast (68) in a vertical position parallel with the vehicle mast. A coupler mounting strap (70) is attached to and circumvents the coupler mount. When the ball mount and hitch coupler mount are attached to the vehicle and trailer and the vehicle is maneuverably backed toward the trailer, the masts (58) and (68) may be visually aligned to guide the vehicle in a straight line until a vehicle mast designator (60) on the vehicle mast engages a trailer mast stop (78) on the trailer mast advising the vehicle driver that alignment has been achieved.

17 Claims, 4 Drawing Sheets

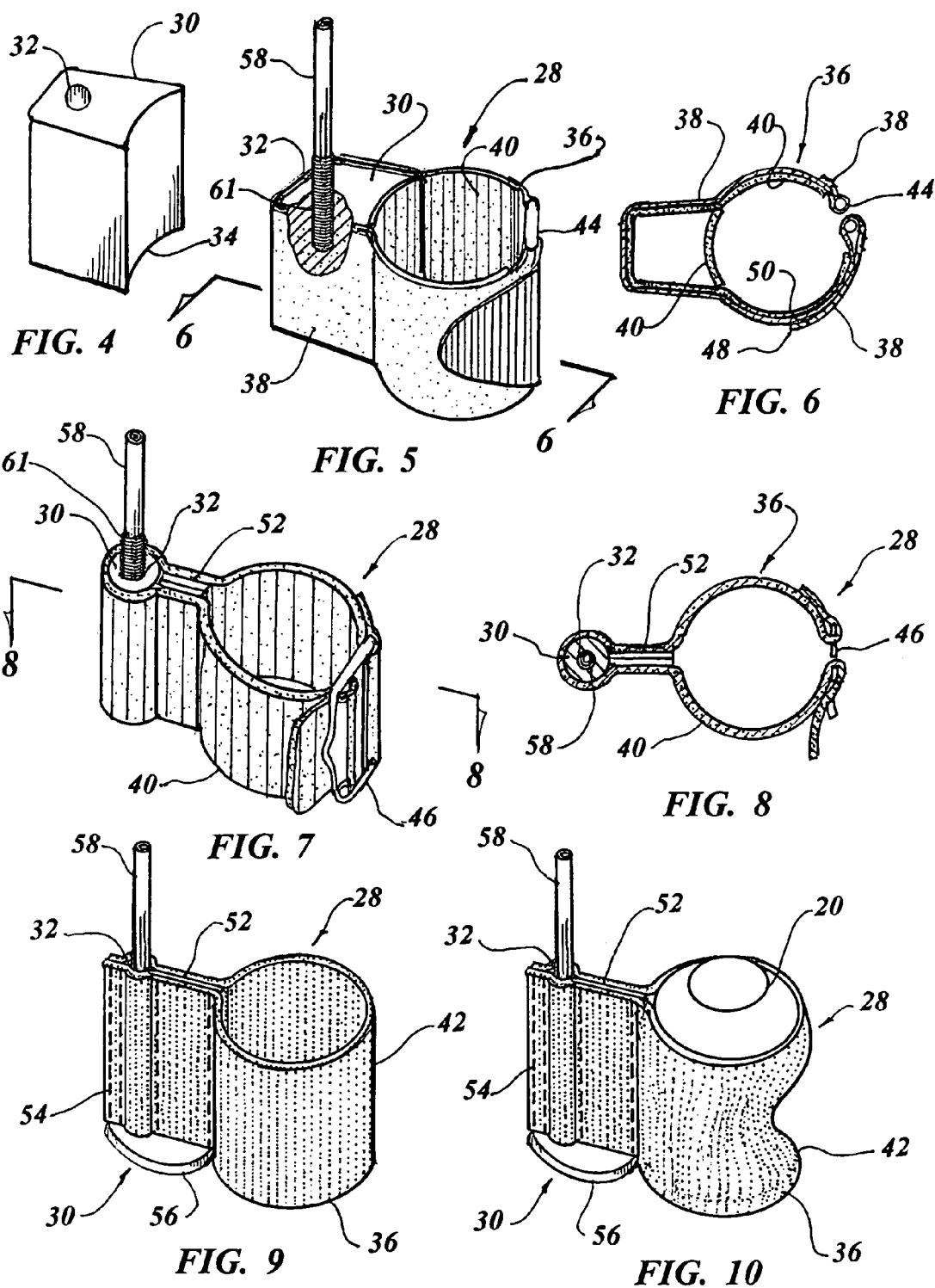

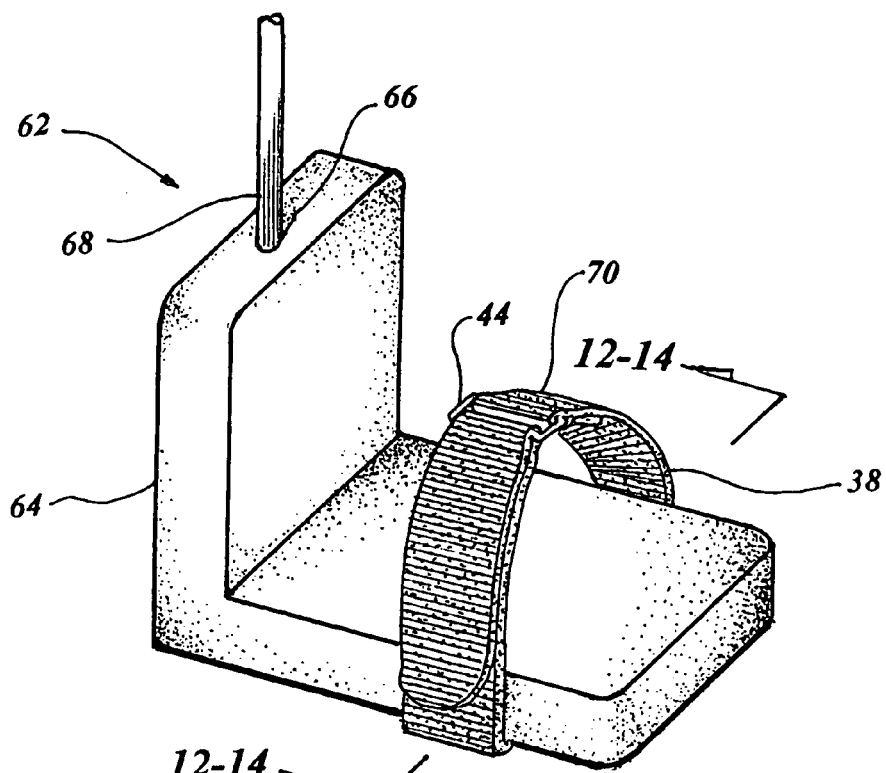
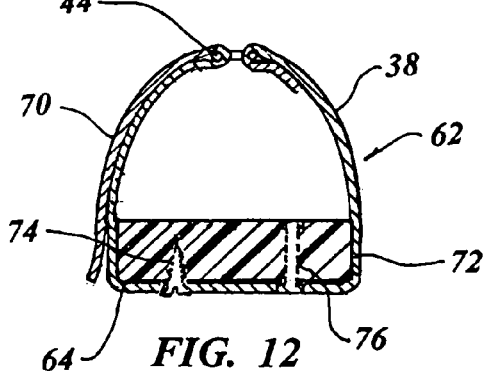
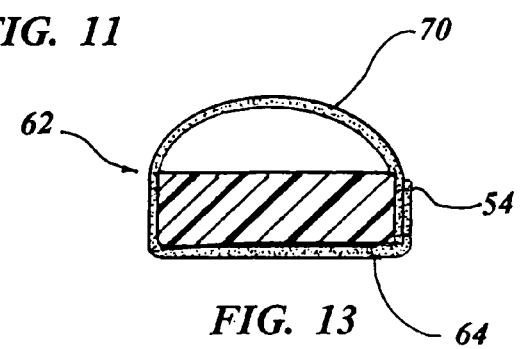
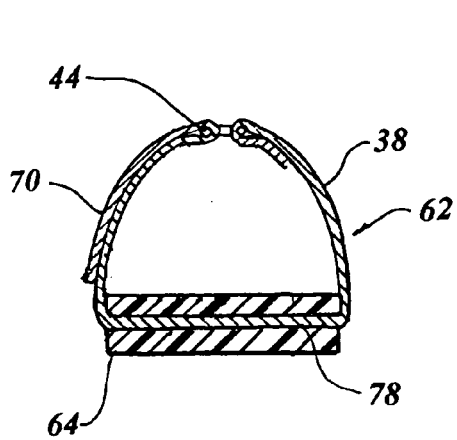
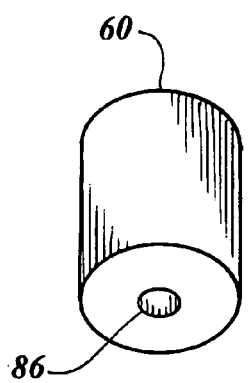
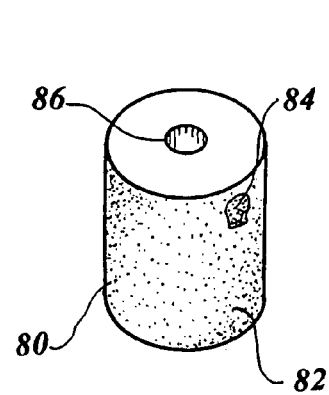
FIG. 11
FIG. 12
FIG. 13
FIG. 14
FIG. 15
FIG. 16

TRAILER BACKUP ALIGNMENT GUIDE

CROSS REFERENCE TO RELATED APPLICATION

This application claims priority of Provisional Patent Application Ser. No. 60/898,185 filed Jan. 30, 2007.

TECHNICAL FIELD

The present invention relates to alignment devices in general and more specifically to a two-part guide removeably connected to a vehicle hitch ball and a trailer hitch coupler to permit visual maneuvering while backing the vehicle so as to align the hitch coupler directly over the ball for final engagement.

BACKGROUND ART

Previously, many types of trailer hitch alignment guides have been used in endeavoring to provide an effective means to visual maneuver a vehicle while backing toward a trailer to align the hitch coupler adjacent to the ball for engagement of the trailer to the vehicle.

A search of the prior art did not disclose any patents that possess the novelty of the instant invention; however the following U.S. patents are considered related:

|  | Inventor | Issue Date |
|---|---|---|
| U.S. Pat. No. | | |
| 4,723,788 | Suter | Feb. 9, 1988 |
| 5,035,441 | Murray | Jul. 30, 1991 |
| 5,269,554 | Law et al. | Dec. 14, 1993 |
| 6,139,041 | Murphy | Oct. 31, 2000 |
| 6,764,091 | Grasso et al. | Jul. 20, 2004 |
| 6,820,888 | Griffin | Nov. 23, 2004 |
| Patent Application Publication | | |
| 2002/0070529 | Dravecz | Jun. 13, 2002 |

Suter in U.S. Pat. No. 4,723,788 teaches an apparatus with interfitting masts with a first mast mounting on top of a socket and a second mast includes a collar which engages onto the ball. When the two masts nest together the socket is directly over the ball.

U.S. Pat. No. 5,269,554 issued to Law et al. is for an alignment guide including guide assemblies one mounted to the trailer ball hitch and the other to the trailer tongue. Each guide includes telescoping vertical leg members for alignment.

Murphy in U.S. Pat. No. 6,139,041 discloses a trailer hitching alignment aid which mounts over the ball hitch and a magnetic trailer mounted assembly mounted on the trailer tongue. A light source is coupled to an upper end of a guide rod with a switch that is energized when the switch and actuator are aligned.

Grasso et al. in U.S. Pat. No. 6,764,091 teaches an alignment device with two units each having press-on members. The ball neck member has a "C" shaped bottom portion and the hitch engaging member has a "U" shaped bottom portion.

U.S. Pat. No. 6,820,888 issued to Griffin comprises a telescoping guide post attached to the top of the hitch socket and a receiver has a magnetic mounting base. When the mounting base, which includes a "Y" member, contacts the upright member the driver is informed that the socket aligns with the tongue of the trailer.

Patent Application Publication No. 2002/0070529 of Dravecz discloses an alignment system utilizing reflective tape on rods with cast clamps and magnetic patches for attachment.

For background purposes and as indicative of the art to which the invention is related reference may be made to the remaining cited U.S. Pat. No. 5,035,441 issued to Murray

DISCLOSURE OF THE INVENTION

The problem of attaching the hitch device on a vehicle to the hitch of a trailer without any visual method of alignment has been with us for as long as motor vehicles have used trailers for hauling. A myriad of devices have been invented to solve this problem for all kinds of trailers and attachment methods such as magnets holding indicating posts, mirrors attached to brackets or directly to vehicles to visibly orient the connection, targets, cross arms, sound and indicator light devices and a host of others. The major problem that has plagued the prior art is that the systems are large, complicated and costly and therefore have not been popular on today's market.

It is therefore the primary object of the invention to provide a trailer backup alignment guide that has all of the functional advantages of the prior art but is readily deployable, simple and inexpensive granting it to be within the reach of all.

An important object of the invention provides a system which is easily dismantled after use into a compact configuration while retaining all components in close proximity to each other, thus minimizing the potential for loss of any single component.

Another object of the invention is its ease of application as the ball mount is simply placed over the vehicle hitch ball and manually tightened. A telescoping vehicle mast is then inserted into the ball mount, extended and aligned in a vertical position. The trailer hitch coupler is placed under the ball receiving portion of the coupler and the strap is placed over the top and tightened in like manner. A similar trailer mast is then attached and aligned vertically which, in both cases, their utility and installation is intuitively obvious to the operator of the vehicle.

Still another object of the invention provides an alignment system that is inherently robust and yet is capable of fitting hitch balls including the 1⅞, 2 and 2⅛ inch diameter with no special adjustment procedures necessary, instead simply tightening the flexible strap around the ball regardless of its diameter and overlapping the coupler with the same type of flexible strap is all the adjustment necessary.

Yet another object of the invention is the simplicity of use since the two masts are easily aligned visibly when backing the vehicle and when arriving in close proximity the vehicle mast designator touches the reflecting trailer mast stop providing movement that is visible to the driver of the vehicle indicating the alignment has been achieved. The driver then removes the guide system and lowers the trailer coupler onto the hitch ball.

A further object of the invention provides easy identification of the masts since they may optionally include a fluorescent or reflective surface which greatly improves the visibility at night as most modern vehicles include back-up lights that would energize the fluorescent material and reflect from the masts and also the mast stop.

A final object of the invention is realized due to the guide's utility diversification as it may be used with not only the common size hitches, as previously described, but with any trailer using a similar hitch style. Boat trailers are prime candidates with house trailers, horse trailers and utility trailers all being equally applicable.

These and other objects and advantages of the present invention will become apparent from the subsequent detailed description of the preferred embodiment and the appended claims taken in conjunction with the accompanying drawings.

BRIEF DESCRIPTION OF THE DRAWINGS

FIG. 4 is a partial isometric view of the ball mount base block shown by itself for clarity.

FIG. 5 is a partial isometric view of the complete vehicle ball mount with the vehicle mast in place in the preferred embodiment.

FIG. 6 is a top plan view of the flexible ball mounting strap in the preferred embodiment removed from the ball mount for clarity.

FIG. 7 is a partial isometric view of a second embodiment of the vehicle ball mount using a cylindrical sleeve and spacers as the base block.

FIG. 8 is a cross sectional view taken along lines 8-8 of FIG. 7.

FIG. 9 is a partial isometric view of a third embodiment of the vehicle ball mount using elastic woven material and an eccentric cam as the base block.

FIG. 10 is a partial isometric view of the third embodiment of the vehicle ball mount using elastic woven material as it would look stretched over a vehicle ball mount, cut away to illustrate the stem of the eccentric cam.

FIG. 11 is a partial isometric view of the trailer hitch coupler mount in the preferred embodiment.

FIG. 12 is a cross sectional view taken along lines 12-12 of FIG. 11 illustrating the webbing strap in conjunction with a slide and hook and loop tape.

FIG. 13 is a cross sectional view taken along lines 13-13 of FIG. 11 illustrating an alternate embodiment using an elastic strap circumventing the coupler base block for attachment to the coupler.

FIG. 14 is a cross sectional view taken along lines 14-14 of FIG. 11 illustrating an alternate embodiment using a webbing strap within a slot in the coupler base block for attachment of the strap to the coupler.

FIG. 15 is a partial isometric view of the vehicle mast designator for the vehicle mast in the preferred embodiment.

FIG. 16 is a partial isometric view of the trailer mast stop in the preferred embodiment.

BEST MODE FOR CARRYING OUT THE INVENTION

Figure 1:
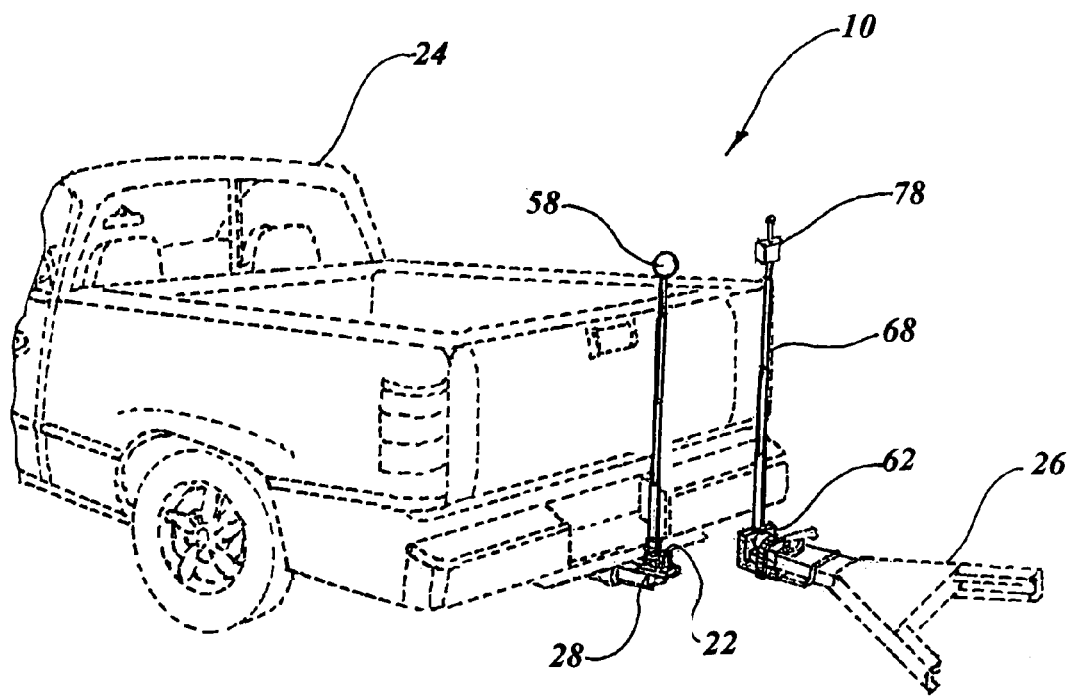
FIG. 1 is a partial isometric view of the trailer backup alignment guide in the preferred embodiment attached mutually to a vehicle and a trailer, both of which are shown pictorially in dotted lines as they are not part of the invention.

The best mode for carrying out the invention is presented in terms of a preferred embodiment. This preferred embodiment is shown in FIGS. 1 thorough 16 and is comprised of a trailer backup alignment guide apparatus 10 aligning a vehicle hitch ball 20 to a trailer coupler 22 for attachment of a vehicle 24 to a trailer 26.

A vehicle ball mount 28 is attached to the vehicle hitch ball 20 in three basic embodiments. The preferred embodiment is shown in FIGS. 1-6, with the second and third embodiments shown in FIGS. 7-10 consecutively which utilize somewhat different methods of attachment to the vehicle hitch ball 20 while serving the same purpose as the hitch ball 20 is securely encompassed in all three embodiments.

The preferred embodiment the vehicle ball mount 28 incorporates a resilient ball mount base block 30 having a hitch ball mast bore 32 therein, as shown individually in FIG. 4. The ball mount base block 30 preferably has a shape that includes a radial portion 34 interfacing with the hitch ball 20 on the side next to the vehicle 24. The remainder of the shape may be any configuration such as rectangular, triangular, circular, oval, cylindrical, irregular or polygonal.

The material for the base block 30 is preferably a thermoplastic elastomer semi-rigid foam resin however other materials may be used such as closed cell neoprene sponge, STYROFOAM®, injection molded thermoplastic or the like, as long as they are rigid enough to hold their shape and provide a suitable attachment hitch ball mast bore 32.

Figure 3:
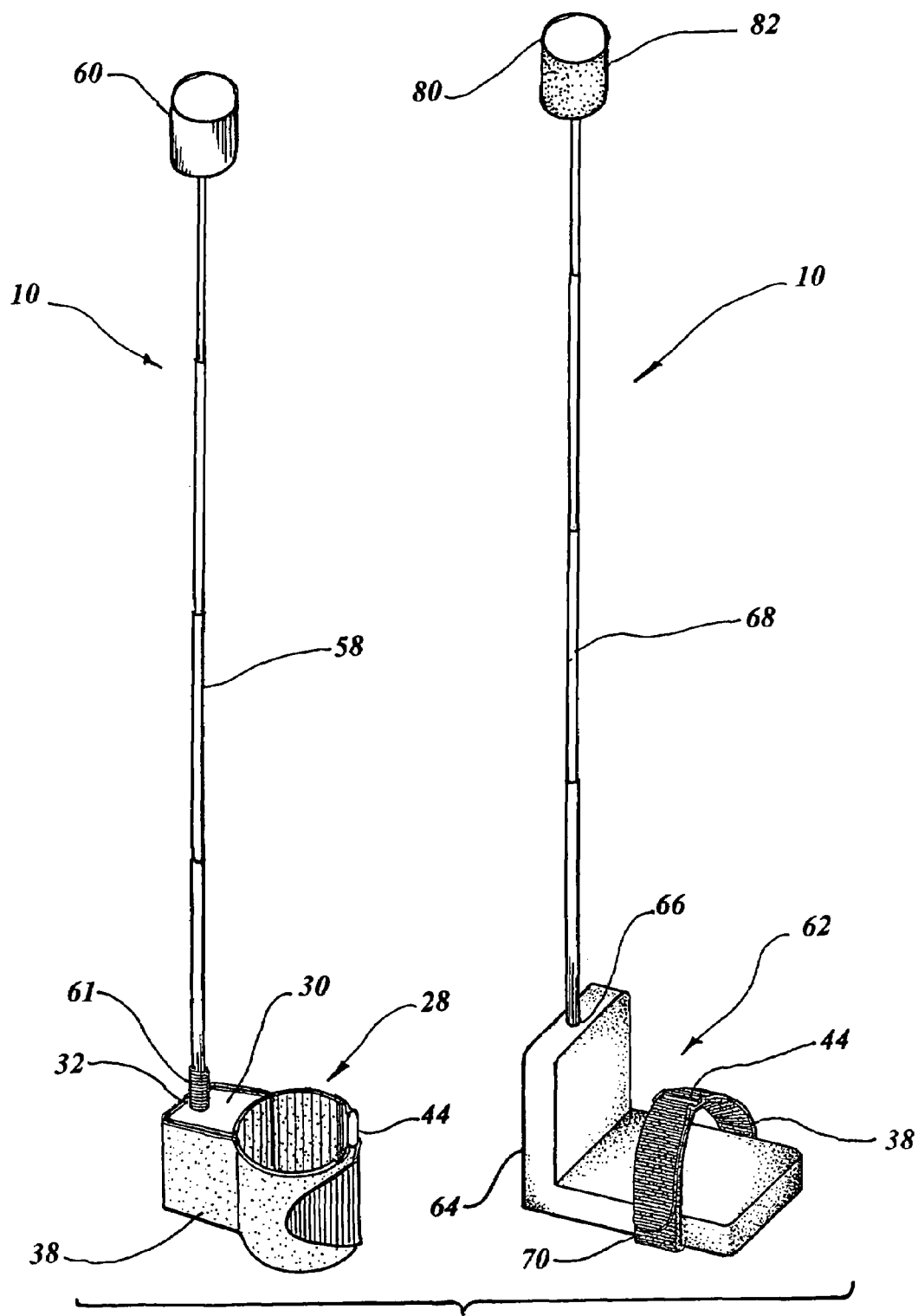
FIG. 3 is a partial isometric view of the trailer backup alignment guide which consists of the preferred embodiment of a vehicle ball mount and a trailer hitch coupler mount.

A flexible ball mounting strap 36 is attached to and circumvents the ball mount base block 30, as shown in FIGS. 3, 5 and 6. The ball mounting strap 36 is configured to encompass the vehicle hitch ball 20 and attach to itself thereabout. The ball mounting strap 36 consists of a material including hook and loop tape 38 shown in FIGS. 5-6, strap webbing 40 illustrated in FIGS. 7-8 and elastic woven material 42, depicted in FIGS. 9-10. In the case of the non-elastic material the ends may be attached with a fastener such as a thermoplastic resin or metallic slide 44, or a thermoplastic resin or metallic buckle 46 or the like.

The preferred embodiment of the mounting strap 36 is illustrated in FIGS. 3-6 and consists of a combination of a strap webbing 40 portion on the inside attached to hook and loop tape 38 on the outside. Each end is looped through a slide 44 with the hook side of the tape attached to the loop side for tightening purposes on the first end 48 and attached to itself on the second end 50 as illustrated in FIG. 6. The flexible ball mounting strap 36 is coupled to the ball mount base block 30 with some type of connecting means including adhesive, screws or rivets such as illustrated in FIG. 12.

The second embodiment of the mounting strap 36 is illustrated in FIGS. 7 and 8 and incorporates strap webbing 40 and a spacer or spacers 52 with the distal ends attached to a buckle 46. The base block 30 is in the form of a cylinder including a hollow in the center to form the hitch ball mast bore 32.

The third embodiment of the mounting strap 36 depicted in FIGS. 9 and 10 utilizes elastic woven material 42 and at least one spacer 52 with the looped material forming the hitch ball mast bore 32 utilizing parallel sewn seams 54. A stemmed eccentric cam 56 has the stem inserted into the bottom of the hitch ball mast bore 32 which functions when rotated to compensate for the different base sizes of trailer hitch ball 20 and permits the mast to be vertical when the material is stretched over the hitch ball 20, as illustrated in FIG. 10. While there are three distinct embodiments of the mounting strap 36 described and illustrated, other combinations are anticipated using the elements outlined as well as other materials which are included within the scope of the invention.

A vehicle mast 58, preferably the telescoping type, is disposed within the hitch ball mast bore 32 in a vertical position permitting the mast 58 to be removably secured therein. The vehicle mast 58 is preferably formed of a metallic or thermoplastic plastic resin material, both well known in the art. A visual exterior surface may be incorporated consisting of a fluorescent surface, a reflective surface, or the like, to make the vehicle mast 58 more visible in both the day and the night.

Figure 2:
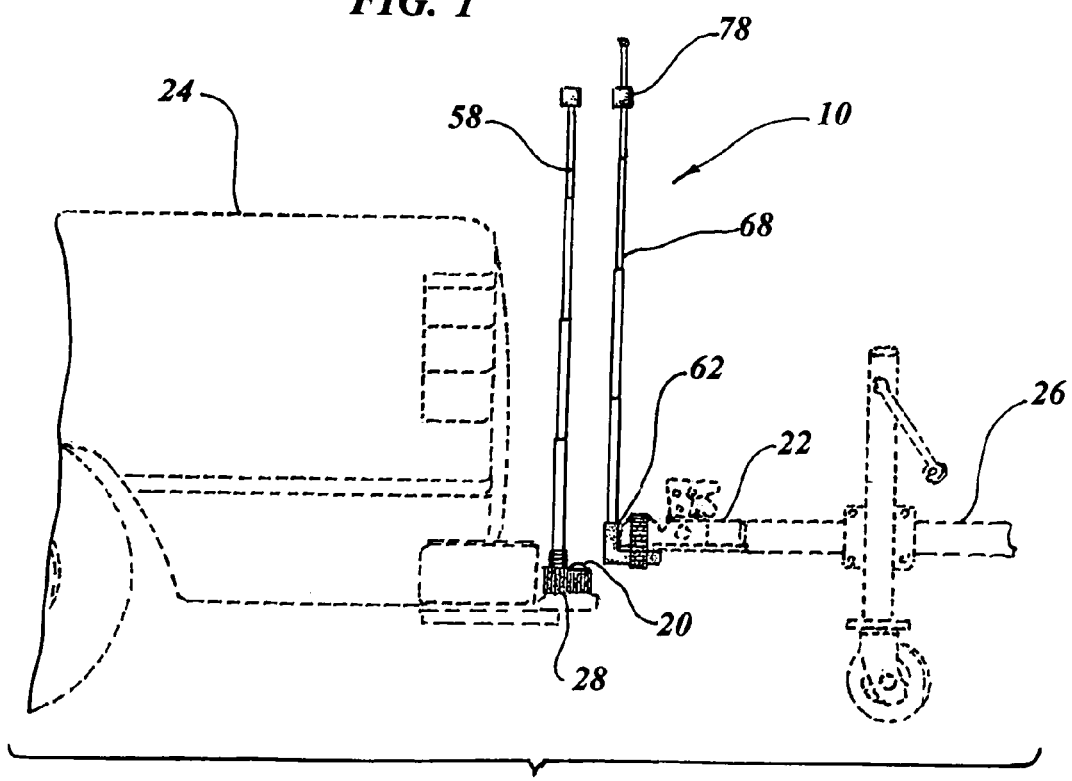
FIG. 2 is a side elevation view of the trailer backup alignment guide in the preferred embodiment attached mutually to a vehicle and a trailer, both of which are shown pictorially in dotted lines as they are not part of the invention.

A vehicle mast designator 60 is preferably attached to the distal end of the vehicle mast 58 for easy visual identification. The mast designator 60 may be any shape and size however the cylindrical shape is preferred, as illustrated in FIG. 3, with a round shape, or a square shape acceptable, as shown in FIGS. 1 and 2 respectively.

The telescoping vehicle mast 58 is spring loaded with a extension spring 61 that is partially inserted into the hitch ball mast bore 32, as shown in FIGS. 1-3, 5, 7, 9 and 10. The vehicle mast 58 is tightly secured within a remaining portion of the extension spring 61 permitting the vehicle mast 58 to be displaced angularly when advising a vehicle driver that alignment has been achieved. The extension spring may be the conventional type made of spring steel or stainless steel and is sized to fit the vehicle mast 58 tightly on its inside diameter preferably with an interference fit.

A trailer hitch coupler mount 62 is provided for attachment to the trailer coupler 22 which incorporates a resilient coupler base block 64, including a coupler bore 66 therein, as illustrated in FIGS. 11-14. The coupler base block 64 is preferably in an L-shape providing a cushion between the trailer 26 and the vehicle 24 preventing inadvertent damage to the vehicle 24. The coupler base block 64 is made of a thermoplastic elastomer semi-rigid foam resin or a similar semi-rigid material; the same as used in the ball mount base block 30.

A trailer mast 68, preferably the telescoping type, is disposed within the coupler bore 66 in a vertical position permitting the trailer mast 68 to be removably secured therein. The trailer mast 68 is preferably formed of a metallic or thermoplastic plastic resin material. A visual exterior surface may be incorporated onto the trailer mast 68, the same as employed on the vehicle mast 58, consisting of a fluorescent or reflective surface for day or night visibility.

A flexible coupler mounting strap 70 is attached to and circumvents the coupler base block 64, as illustrated in FIGS. 11-14. The coupler mounting strap 70 is configured to encompass the trailer coupler 22 and attach to itself around or through with coupler securing means. The coupler mounting strap 70 may consist any of the following materials; hook and loop tape 38, strap webbing 40 or elastic woven material 42. The hook and loop tape 38 is preferred, as shown in FIGS. 11 and 12 with strap webbing 40 an acceptable substitute similar to the configuration of FIGS. 7 and 8. The flexible coupler mounting strap 70 in the strap webbing 40 configuration incorporates a strap engaging fastener in the form of a metallic or thermoplastic resin slide 44 or a metallic or thermoplastic resin buckle 46. The slide 44 is preferred in the hook and loop tape 38 configuration, as depicted in FIGS. 11 and 12.

In the hook and loop and strap configurations the coupler mounting strap 70 is attached to the coupler base block 64 with connecting means in the form of adhesive 72, screws 74 or rivets 76, as alternately shown in FIG. 12. It should be understood that the same connecting means may be used to attach the strap material to the base block 30 of the ball mount 28. FIG. 14 illustrates another method for securing the coupler mounting strap 70 to the coupler base block 64 utilizing a slot 78 therethrough sized to receive and retain the flexible coupler mounting strap 70.

An alternate embodiment of the coupler mounting strap 70 is illustrated in FIG. 13 which uses a single band of woven material 42, glued or stitched together, which simply stretches sufficiently to slide over the trailer coupler 22 and grips the top of the ball portion with the vertical and horizontal surfaces of the base block 64 intimately embracing the bottom of the coupler 22 under the tension of the elastic woven material 42.

A trailer mast stop 80, illustrated in FIGS. 1-3 and 16, is removably attached to a distal end of the trailer mast 68 and may have any shape; however a cylindrical shape is preferred, as illustrated in FIGS. 3 and 16. An oblong shape or a square shape may also be acceptable, as shown in FIGS. 1 and 2 respectively.

The trailer mast stop 80 incorporates a reflective surface 82, such as a thermoplastic reflector or reflective tape in both cases having a pressure sensitive adhesive backing 84 thereon. The trailer mast stop 80 is preferably formed of a thermoplastic elastomer semi-rigid foam resin or some other material having similar properties. The reflecting surface 82 permits backup lights on the vehicle 24 to illuminate the trailer mast stop 80 at night. A cavity 86 is formed within the trailer mast stop 80 for gripping and retaining the trailer mast 68, as illustrated in FIG. 16.

When the ball mount 28 and hitch coupler mount 62 are attached to the vehicle 24 and trailer 26, the vehicle 24 may be maneuverably backed toward the trailer for attachment. During the backing process the masts 58 and 68 may be visually aligned to guide the vehicle 24 in a straight line until vehicle mast designator 60 engages the trailer mast stop 80 on the trailer mast 68 visibly moving the vehicle mast 58 backward toward the vehicle 24 allowed by the yielding of the extension spring 61, advising the vehicle driver that alignment has been achieved. The hitch ball mount 28 and trailer hitch coupler mount 62 may then be manually removed and the trailer coupler 22 lowered directly onto the aligned ball 20 completing the attachment without further adjustment.

While the invention has been described in complete detail and pictorially shown in the accompanying drawings, it is not to be limited to such details, since many changes and modifications may be made to the invention without departing from the spirit and scope thereof. Hence, it is described to cover any and all modifications and forms which may come within the language and scope of the appended claims.

The invention claimed is:

1. A trailer backup alignment guide apparatus for aligning a vehicle hitch ball to a trailer coupler for attachment therebetween, wherein the apparatus comprises;

a vehicle ball mount for attachment to the hitch ball of a vehicle, said vehicle ball mount incorporates a resilient ball mount base block with the ball mount base block having a hitch ball mast bore therein, a flexible ball mounting strap attached to and circumventing the ball mount base block, said ball mounting strap configured to encompass the vehicle ball mount and attach to itself thereabout, a spring loaded telescoping vehicle mast disposed within the hitch ball mast bore in a vertical position permitting the mast to be removably secured therein, wherein said vehicle mast further having a visual exterior surface selected from the group consisting of a fluorescent surface and a reflective surface, a trailer hitch coupler mount for attachment to the trailer coupler, said trailer hitch coupler mount incorporates a resilient coupler base block having a coupler mast bore therein, a telescoping trailer mast disposed within the coupler mast bore in a vertical position parallel with the vehicle mast permitting the trailer mast to be removably secured therein, a flexible coupler mounting strap attached to and circumventing the coupler base block, said coupler mounting strap configured to encompass the coupler base block and attach to itself thereabout with means for securing said coupler mounting strap to said coupler base block, and a trailer mast stop removably attached to a distal end of the telescoping trailer mast such that when the vehicle ball mount and trailer hitch coupler mount are attached to the vehicle and a trailer, and the vehicle is maneuverably backed toward the trailer, the masts may be visually aligned to guide the vehicle in a straight line until the vehicle mast engages the trailer mast stop on the trailer mast advising a vehicle driver that alignment has been achieved.

2. The trailer backup alignment guide apparatus as recited in claim 1 wherein said vehicle ball mount base block further having a shape selected from the group consisting of a rectangular shape, a truncated wedge shape combined with a radial edge, a round shape and a cylindrical shape.

3. The trailer backup alignment guide apparatus as recited in claim 1 wherein said ball mount base block is constructed of a thermoplastic elastomer semi-rigid foam resin.

4. The trailer backup alignment guide apparatus as recited in claim 1 wherein said flexible ball mounting strap further comprises a material selected from the group consisting of hook and loop tape, strap webbing and elastic woven material.

5. The trailer backup alignment guide apparatus as recited in claim 1 wherein said flexible ball mounting strap is coupled to the ball mount base block with connecting means selected from the group consisting of an adhesive, a plurality of screws, plurality of rivets and sewn seams.

6. A trailer backup alignment guide apparatus for aligning a vehicle hitch ball to a trailer coupler for attachment therebetween, wherein the apparatus comprises;

a vehicle ball mount for attachment to the hitch ball of a vehicle, said vehicle ball mount incorporates a resilient ball mount base block with the ball mount base block having a hitch ball mast bore therein, a flexible ball mounting strap attached to and circumventing the ball mount base block, said ball mounting strap configured to encompass the vehicle ball mount and attach to itself thereabout, a spring loaded telescoping vehicle mast disposed within the hitch ball mast bore in a vertical position permitting the mast to be removably secured therein, a trailer hitch coupler mount for attachment to the trailer coupler, said trailer hitch coupler mount incorporates a resilient coupler base block having a coupler mast bore therein, a telescoping trailer mast disposed within the coupler mast bore in a vertical position parallel with the vehicle mast permitting the trailer mast to be removably secured therein, wherein said spring loaded telescoping vehicle mast further comprises, a material selected from the group consisting of a metal and a thermoplastic plastic resin, and said telescoping vehicle mast is spring loaded with a extension spring partially inserted into said hitch ball mast bore with the vehicle mast tightly secured within a remaining portion of the extension spring such that the vehicle mast is able to be displaced angularly when abutting the trailer mast stop thereby advising the vehicle driver that alignment has been achieved, a flexible coupler mounting strap attached to and circumventing the coupler base block, said coupler mounting strap configured to encompass the coupler base block and attach to itself thereabout with means for securing said coupler mounting strap to said coupler base block, and a trailer mast stop removably attached to a distal end of the telescoping trailer mast such that when the vehicle ball mount and trailer hitch coupler mount are attached to the vehicle and a trailer, and the vehicle is maneuverably backed toward the trailer, the masts may be visually aligned to guide the vehicle in a straight line until the vehicle mast engages the trailer mast stop on the trailer mast advising a vehicle driver that alignment has been achieved.

7. A trailer backup alignment guide apparatus for aligning a vehicle hitch ball to a trailer coupler for attachment therebetween, wherein the apparatus comprises;

a vehicle ball mount for attachment to the hitch ball of a vehicle, said vehicle ball mount incorporates a resilient ball mount base block with the ball mount base block having a hitch ball mast bore therein, a flexible ball mounting strap attached to and circumventing the ball mount base block, said ball mounting strap configured to encompass the vehicle ball mount and attach to itself thereabout, a spring loaded telescoping vehicle mast disposed within the hitch ball mast bore in a vertical position permitting the mast to be removably secured therein, a trailer hitch coupler mount for attachment to the trailer coupler, said trailer hitch coupler mount incorporates a resilient coupler base block having a coupler mast bore therein, wherein said resilient coupler base block further having an L-shape therefore providing a cushion between the trailer and the vehicle to prevent inadvertent damage to the vehicle, a telescoping trailer mast disposed within the coupler mast bore in a vertical position parallel with the vehicle mast permitting the trailer mast to be removably secured therein, a flexible coupler mounting strap attached to and circumventing the coupler base block, said coupler mounting strap configured to encompass the coupler base block and attach to itself thereabout with means for securing said coupler mounting strap to said coupler base block, and a trailer mast stop removably attached to a distal end of the telescoping trailer mast such that when the vehicle ball mount and trailer hitch coupler mount are attached to the vehicle and a trailer, and the vehicle is maneuverably backed toward the trailer, the masts may be visually aligned to guide the vehicle in a straight line until the vehicle mast engages the trailer mast stop on the trailer mast advising a vehicle driver that alignment has been achieved.

8. The trailer backup alignment guide apparatus as recited in claim 1 wherein said resilient coupler base block is constructed of a thermoplastic elastomer semi-rigid foam resin.

9. The trailer backup alignment guide apparatus as recited in claim 1 wherein said trailer mast is constructed of a material selected from the group consisting of a metal and a thermoplastic plastic resin.

10. The trailer backup alignment guide apparatus as recited in claim 1 wherein said trailer mast further comprises a visual exterior surface selected from the group consisting of a fluorescent finish and a reflective surface.

11. The trailer backup alignment guide apparatus as recited in claim 1 wherein said flexible coupler mounting strap further comprises a material selected from the group consisting of a portion of hook and loop tape, a portion of strap webbing and a portion of elastic woven material.

12. The trailer backup alignment guide apparatus as recited in claim 11 wherein said webbing material of said flexible coupler mounting strap incorporates a strap engaging fastener for end securement and tightening.

13. The trailer backup alignment guide apparatus as recited in claim 12 wherein said strap engaging fastener is selected from the group consisting of a thermoplastic resin slide, a thermoplastic resin buckle and a metallic buckle.

14. The trailer backup alignment guide apparatus as recited in claim 1 wherein said flexible coupler mounting strap is attached to the coupler base block with connecting means selected from the group consisting of an adhesive, a plurality of screws, a plurality of rivets, sewn stitches and said coupler base block having a slot therethrough sized to receive and retain the flexible coupler mounting strap.

15. The trailer backup alignment guide apparatus as recited in claim 1 further comprising a vehicle mast designator having a shape selected from the group consisting of a cylindrical shape, a round shape and a square shape.

16. The trailer backup alignment guide apparatus as recited in claim 1 wherein said trailer mast stop having a shape selected from the group consisting of a cylindrical shape, an oblong shape and a square shape.

17. The trailer backup alignment guide apparatus as recited in claim 1 wherein said trailer mast stop further having a reflecting surface thereon such that backup lights on the vehicle illuminates the trailer mast stop at night.

\* \* \* \* \*